United States Patent
Sekharan et al.

(10) Patent No.: US 9,458,352 B2
(45) Date of Patent: Oct. 4, 2016

(54) PRE-MOLDING ARTICLE FROM THERMOSET POLYMER DISPERSIONS

(71) Applicant: Dow Global Technologies LLC, Midland, MI (US)

(72) Inventors: Manesh N. Sekharan, Midland, MI (US); Daniel L. Dermody, Midland, MI (US); Michael E. Hus, Midland, MI (US); David H. Bank, Midland, MI (US); Peter Cate, Blockley (GB); Liang Hong, Schwenksville, PA (US); Scott T. Burr, Midland, MI (US); David L. Malotky, Midland, MI (US); Timothy J. Young, Bay City, MI (US); Matthew J. Kalinowski, Freeland, MI (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

(21) Appl. No.: 14/368,439

(22) PCT Filed: Feb. 11, 2013

(86) PCT No.: PCT/US2013/025489
§ 371 (c)(1),
(2) Date: Jun. 24, 2014

(87) PCT Pub. No.: WO2013/122848
PCT Pub. Date: Aug. 22, 2013

(65) Prior Publication Data
US 2015/0218413 A1    Aug. 6, 2015

Related U.S. Application Data

(60) Provisional application No. 61/599,068, filed on Feb. 15, 2012.

(51) Int. Cl.
*C09D 163/04*    (2006.01)
*C08J 5/04*    (2006.01)
*C08J 5/24*    (2006.01)
*C08K 7/02*    (2006.01)

(52) U.S. Cl.
CPC ............ *C09D 163/04* (2013.01); *C08J 5/04* (2013.01); *C08J 5/041* (2013.01); *C08J 5/042* (2013.01); *C08J 5/043* (2013.01); *C08J 5/044* (2013.01); *C08J 5/24* (2013.01); *C08K 7/02* (2013.01); *C08L 2205/025* (2013.01)

(58) Field of Classification Search
CPC ............................ C08L 63/00; C09D 163/04
USPC ......................................................... 523/428
See application file for complete search history.

(56) References Cited

U.S. PATENT DOCUMENTS

| | | |
|---|---|---|
| 3,879,324 A | 4/1975 | Timmons et al. |
| 3,993,843 A | 11/1976 | Vasta |
| 4,018,426 A | 4/1977 | Mertz et al. |
| 4,222,918 A | 9/1980 | Zentner et al. |
| 4,315,044 A | 2/1982 | Elmore et al. |
| 4,522,953 A | 6/1985 | Barby et al. |
| 4,886,485 A | 12/1989 | Bartoletto |
| 4,962,162 A * | 10/1990 | Kosuda ............... C08L 63/00 523/400 |
| 5,198,472 A | 3/1993 | DesMarais et al. |
| 5,210,104 A | 5/1993 | Bass et al. |
| 5,539,021 A | 7/1996 | Pate et al. |
| 5,539,025 A | 7/1996 | Smith et al. |
| 5,688,842 A | 11/1997 | Pate, III et al. |
| 5,827,907 A * | 10/1998 | Gotro ................. C08L 71/00 523/206 |
| 6,147,131 A | 11/2000 | Mork et al. |
| 6,156,806 A | 12/2000 | Piechocki et al. |
| 6,653,369 B2 | 11/2003 | Gerlitz et al. |
| 6,656,302 B2 * | 12/2003 | Kishi .................. B29B 15/122 158/162 |
| 8,063,128 B2 | 11/2011 | Moncla et al. |
| 2003/0064223 A1 | 4/2003 | Simmons et al. |
| 2004/0012478 A1 * | 1/2004 | Taguchi ............... H01C 10/305 338/160 |
| 2005/0100754 A1 | 5/2005 | Moncla et al. |
| 2007/0087202 A1 | 4/2007 | Simmons et al. |
| 2009/0068395 A1 | 3/2009 | Kousaka et al. |
| 2010/0280151 A1 | 11/2010 | Nguyen et al. |
| 2011/0111663 A1 * | 5/2011 | Kawamoto ......... C08G 59/5033 442/175 |
| 2014/0039118 A1 * | 2/2014 | Renkel ............... C08G 18/4045 524/590 |
| 2014/0113992 A1 * | 4/2014 | Chen .................. C08L 63/00 523/201 |
| 2015/0175755 A1 * | 6/2015 | Sekharan ................ C08J 5/04 523/222 |
| 2015/0322257 A1 * | 11/2015 | Hirano ................ C08L 63/00 428/414 |

FOREIGN PATENT DOCUMENTS

| | | |
|---|---|---|
| EP | 1146149 A1 | 10/2001 |
| JP | 11179725 A | 3/1999 |
| JP | 2005298713 A | 10/2005 |
| WO | 9964216 | 12/1999 |
| WO | 0246276 A2 | 6/2002 |
| WO | 2009074293 A1 | 6/2009 |
| WO | 2010046770 A1 | 4/2010 |
| WO | 2011064176 A1 | 6/2011 |

OTHER PUBLICATIONS

Sekharan, M., et al., "Premolding Article from Thermoset and Thermoplastic Polymer Dispersions", Provisional Applications, Dow Reference No. 72432, U.S. Appl. No. 61/599,062.

Sekharan N., et al., "Pre-Molding Article from Thermoset Polymer Dispersions" Provisional Application, Dow Reference No. 72433, U.S. Appl. No. 61/599,068.

* cited by examiner

Primary Examiner — Megan McCulley
(74) Attorney, Agent, or Firm — The Dobrusin Law Firm, P.C.

(57) ABSTRACT

The invention is directed at new process and systems for preparing composite materials that include a polymer phase and a fiber phase.

20 Claims, 4 Drawing Sheets

PRE-MOLDING ARTICLE FROM THERMOSET POLYMER DISPERSIONS

CLAIM OF PRIORITY

The present application claims the benefit of U.S. Provisional Patent Application No. 61/599,068 (filed on Feb. 15, 2012) which is hereby incorporated by reference in its entirety for all purposes.

BACKGROUND OF THE INVENTION

Composite materials including thermoset resins and fibers have been employed in manufacturing of specialty articles. The processes using these materials are generally labor intensive and require long curing times. Although such processes may be suitable for various specialty applications, they are generally uneconomical compared with other processes, such as short cycle molding operations employed in thermoplastic molding processes. In thermoplastic molding processes, short cycle times can be achieved by injecting a molten thermoplastic into a relatively cold mold (i.e., below the melting temperature or softening temperature of the thermoplastic). and rapidly cooling the thermoplastic material in the mold so that the polymer stiffens sufficiently to be removed from the mold. However, in the case of thermoset materials, it is necessary to cure the thermoset resin which requires high cure temperatures and/or long cure times. Difficulties are also encountered when the thermoset resin is part of a composite material that includes fibers. For example WO 2010/046770 A1 describes making a polymer pre-impregnated reinforcement material using solid particles, but discourages the use of thermoset resins.

The use of dispersions of thermoplastic particles for making glass fibers thermoplastics is described in WO 02/46276 and WO 99/64216. However, the authors describe that such processes would not be useful with thermoset resins. As recognized by the prior art, the properties of thermoset materials, the difficulty of controlling their cure, presents difficulties in developing compositions with industrially applicable properties that can be economically processed, molded and produced into finished industrial parts, particularly when economics of mass production are required.

Although prepreg materials including a thermoset resin and a fiber are known in the art, these prepreg materials generally have some drawbacks. Some of these difficulties may be overcome by the use of high molecular weight thermoset resins, they may pose additional problems.

Therefore, there is a high desire in the pre-molding article and composite industry for an overall system of polymer matrix and fiber reinforcement which can be processed on a reliable basis and can be readily adoptable for high-volume production. Another desire from the industry is the ultrafast curing of these matrix resins. The pre-molding articles may be stored for a long time before they are used in parts manufacturing. During storage, a reactive system is sometimes designed to fast and/or progressively react at room temperature to change the molecular weight of the pre-molding article polymer and hence the process capabilities of the pre-molding articles. In other times, pre-molding articles are stored in a freezer to avoid or slow down potential reactions until the pre-molding articles are ready to be used. As such, there is a need for new materials, systems, and processes for preparing fiber reinforced thermoset composites.

SUMMARY OF THE INVENTION

The present invention provides various new device, systems, and processes of making a pre-molding composite.

The present invention provides a pre-molding article comprising i) a polymer phase including a first thermoset resin, a second thermoset resin having a glass transition temperature that is less than the first thermoset resin, and a curing agent; and ii) an inorganic phase, wherein the inorganic phase is present at a concentration of about 30 volume percent or more based on the total volume of the polymer phase and the inorganic phase.

DETAILED DESCRIPTION

Figure 1:
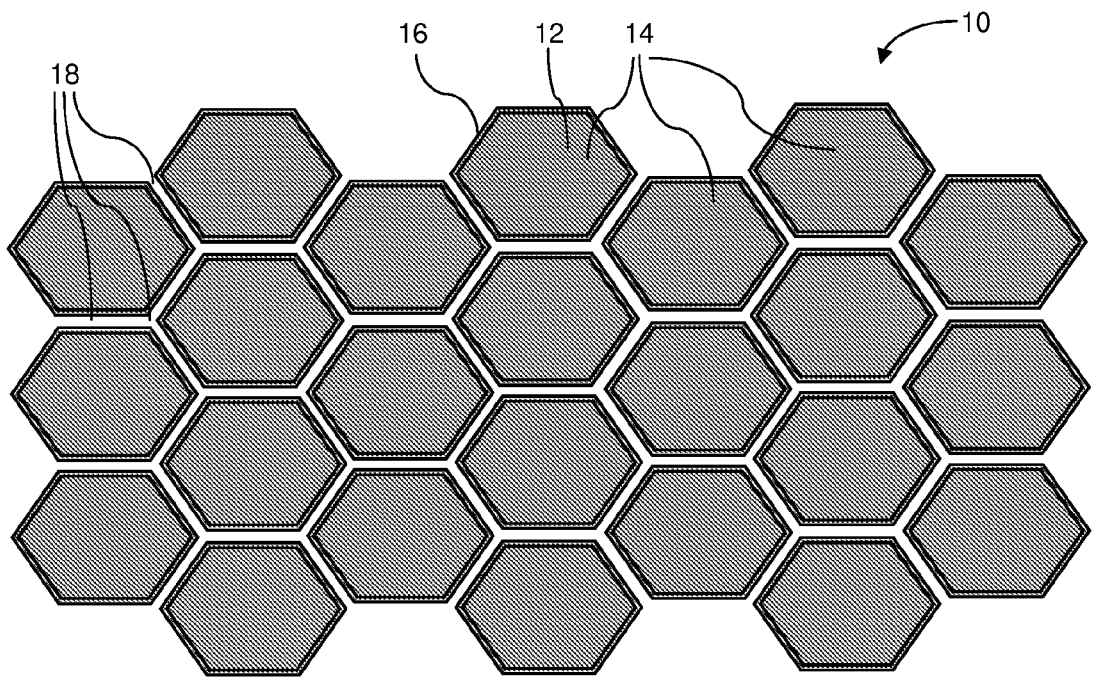
FIG. 1 is a cross-sectional view of an illustrative emulsion having a high concentration of internal phase.

Uses of polymer dispersion (dispersion compositions) for the preparation of pre-molding articles, which can be molded into prepregs, laminates, and other composite articles, have been disclosed in two previously filed U.S. Provisional Patent Applications: 61/599,062 and 61/599,068, both filed on Feb. 15, 2012. Both of these two previously filed patent applications are incorporated herein in their entireties.

The technology which makes the present invention feasible is a dispersion which contains a high content of solid thermoset resin particles, and optionally solid hardeners (i.e., cross-linking agents). The dispersion has a liquid matrix phase. The liquid matrix phase may include, consist essentially of, or consist entirely of water. For example, the dispersion may be an aqueous dispersion. The low viscosity of the dispersion is leveraged to carry the solid particles into the fibrous reinforcement architecture of interest. Once the particles have been dispersed throughout the fibrous architecture, the matrix liquid (e.g., water) is driven off and the viscosity of the material system is then controlled by heat. The viscosity of the initial dispersion is generally much lower than the viscosity of the remaining dispersion ingredients once the matrix liquid has been removed. It has been determined that the viscosity of the dispersion is generally independent of the viscosity of the polymer. The drying step (e.g., the dehydration step) may be completed using any known means. For example, the drying stem may use heat, a dry fluid (such as air having a dew point of about −20° C. or less, or about −40° C. or less), or both.

The present invention provides that the viscosity of the dispersion may be controlled without needing to advance the cross linking reaction or add extra fillers as is currently done in traditional thermoset resin systems (compositions). For example, the viscometrics of an aqueous dispersion composition used in the present invention can easily be controlled with water content, rheology modifiers, shear conditions, or any combination thereof. Since the hardeners and/or cure catalysts can be in solid form or encapsulated to keep it generally separate from the thermoset resin, the dispersion composition can be stored at room temperature, with no need of refrigeration. Various features of the process of preparing the dispersion compositions used in the present invention are described in U.S. Provisional Patent Application Nos. 61/599,062 and 61/599,068, both filed on Feb. 15, 2012 and both incorporated herein by reference in their entirety.

While prepregs are frequently mentioned, the present invention can be applied to all kinds of pre-molding composites made from fibrous reinforcement dispersion compositions.

The polymer dispersion includes a solid phase dispersed in a liquid phase. The liquid phase includes water and/or one or more solvents. The polymer dispersion may be prepared using one or any combination of steps described in U.S. Pat. Nos. 5,539,021, 5,688,842, 8,063,128, and 2005/0100754A1, all incorporated herein by reference. The polymer dispersion includes a sufficient amount of the liquid phase so that the polymer dispersion can flow. The concentration of the liquid phase in the polymer dispersion may be about 5 weight percent, about 10 weight percent or more, about 25 weight percent or more, about 30 weight percent or more, or about 35 weight percent or more, based on the total weight of the polymer dispersion. The concentration of the liquid phase in the polymer dispersion should be sufficiently low so that the polymer dispersion can be easily dried in one or more drying steps, such as a drying step that employs an elevated temperature (e.g., a temperature of about 35° C. or more), that employs a reduce pressure (e.g., a pressure of about 0.5 atmospheres or less), or both. The concentration of the liquid phase in the polymer dispersion may be about 85 weight percent or less, about 75 weight percent or less about 65 weight percent or less, about 55 weight percent or less, about 50 weight percent or less, or about 45 weight percent or less, based on the total weight of the polymer dispersions. Polymer dispersions having a concentration of liquid phase of about 45 weight percent or less are particularly preferred so that drying times may be reduced, and/or so that the energy costs of drying are reduced.

Preferably the liquid phase includes water. For example, the amount of water in the liquid phase may be from about 5% to about 99% or more, based on the total volume of the liquid phase. The amount of water in the liquid phase may be about 100% or less, based on the total volume of the liquid phase. Preferred polymer dispersions are substantially free of or entirely free of volatile organic solvent. The amount of volatile organic solvent may be sufficiently low so that costs (e.g., capital costs and/or operating costs) for solvent recovery systems may be reduced or eliminated. For example, the concentration of volatile organic solvents preferably is about 10 volume percent or less, about 5 volume percent or less, about 2 volume percent or less, about 1 volume percent or less, about 0.5 volume percent or less, or about 0.2 volume percent or less. Particularly preferred polymer dispersions are free of volatile organic solvents in the liquid phases and the solid phase. As used herein, a volatile organic solvent may be a solvent having a boiling point (e.g. at standard temperature and pressure) of about 165° C. or less, about 150° C. or less, about 135° C. or less, about 120° C. or less, about 105° C. or less, about 90° C. or less, or about 75° C. or less.

The solid phase of the polymer dispersion includes one or more polymer. The solid phase preferably includes a sufficient amount of polymer so that the polymer can form a matrix for the fibers of the composite material. The concentration of the solid phase may be about 10 volume percent or more, about 20 volume percent or more, about 30 volume percent or more, about 40 volume percent or more, about 50 volume percent or more, or about 60 volume percent or more, based on the total volume of the polymer dispersion. The concentration of the solid phase may be sufficiently low so that the polymer dispersion can flow and/or impregnate the fibers. For example, the concentration of the solid phase may be about 97 volume percent or less, about 95 volume percent or less, about 90 volume percent or less, or about 85 volume percent or less, based on the total volume of the polymer dispersion. When the polymer dispersion includes a low concentration of particles, it generally has Newtonian flow characteristics with an apparent viscosity that is generally independent of the shear rate. At very high concentrations of particles, the polymer dispersion has flow characteristics that are characteristic of a shear thinning material (i.e., the apparent viscosity decreases with increasing shear rate). Although dispersions in the shear thinning regime may be employed, the dispersion preferably has a sufficiently low concentration of particles that it has Newtonian flow characteristics. At a critical concentration of particles, the material transitions from a Newtonian fluid to a shear thinning fluid. The critical concentration is typically about 55 weight percent, based on the total weight of the polymer dispersion. The critical concentration may depend on any number of compositional variables, including the type of polymer (e.g., the type of epoxy), the particle size and distribution of particle size, and the surfactant. As such, the critical concentration may be higher than 55 weight percent or lower than 55 weight percent.

The one or more polymers of the polymer dispersion preferably includes one or more thermoset resins, one or more thermoplastic resins, or both. If more than one polymer dispersion is employed, as described herein, at least one of the polymer dispersions preferably includes a thermoset resin.

The composite material includes one or more thermoset resins (i.e., thermosetting resins). The composite material may include one or more thermoset resins that are room temperature solids, the composite material may include one or more thermoset resins that are room temperature liquids, or both. For example, the thermoset resin may include a thermoset resin that is a room temperature solid and a thermoset resin that is a room temperature liquid.

The thermoset resin may include, consist essentially of, or consist entirely of linear compounds. For example, the concentration of linear polymer may be about 20 wt. % or more, about 30 wt. % or more, about 40 wt. % or more, about 50 wt. % or more, about 60 wt. % or more, about 70 wt. % or more, about 80 wt. % or more, about 90 wt. % or more, or about 95 wt. % or more, based on the total weight of the thermoset resins and/or based on the total weight of the polymer in the composite material.

A thermoset resin may be characterized as a room temperature solid. The thermoset resin may be a glassy material having a glass transition temperature of about 10° C. or more, of about 20° C. or more, of about 30° C. or more, of about 40° C. or more, of about 50° C. or more, or of about 60° C. Preferably the thermoset resin has a sufficiently low glass transition temperature so that it can be processed at temperatures of about 120° C. or less. For example, the thermoset resin may have a glass transition temperature of about 120° C. or less, about 110° C. or less, about 100° C. or less, about 90° C. or less, or about 80° C. or less. The thermoset resin may be a semi-crystalline resin having a melting temperature of about 30° C. to about 270° C. (e.g., from about 30° C. to about 120° C.). Preferably, the one or more thermoset resins includes, consists essentially of, or consists entirely of glassy materials having a glass transition temperature greater than 25° C. Preferably, the one or more thermoset resins is substantially free of, or entirely free of semi-crystalline resins. If present, the concentration of thermoset resins that are crystalline is preferably about 29 wt. % or less, about 19 wt. % or less, about 9 wt. % or less, or about 4 wt. % or less, based on the total weight of the thermoset resin or based on the total weight of the polymer in the composite material.

The molecular weight of the thermoset resin that is a room temperatures solid (i.e., solid thermoset resin) may be sufficiently high so that the thermoset resin has a glass transition temperature of about 30° C. or more, about 40° C. or more, about 50° C. or more, or about 60° C. or more. When the composition includes both solid and liquid thermoset resins, the solid thermoset resin preferably has a relatively high molecular weight compared with the liquid thermoset resin, where the molecular weight is the number average molecular weight of the resin. For example, the ratio of the molecular weight (e.g., number average molecular weight) of the solid thermoset resin to the molecular weight of the liquid thermoset resin may be about 1.1 or more, about 1.4 or more, about 1.8 or more, about 2.4 or more, about 3 or more, or about 4.5 or more. Preferred solid thermoset resins have an epoxide equivalent weight of about 400 or more, about 600 or more, about 1000 or more, or about 1500 or more. The solid thermoset resin preferably has an epoxide equivalent weight of about 14000 or less, about 6000 or less, about 4000 or less, or about 2500 or less. Preferred solid thermoset resins have a number average molecular weight of about 800 daltons or more, about 1200 daltons or more, about 2000 daltons or more, or about 3000 daltons or more. The solid thermoset resin preferably has a number average molecular weight of about 28000 or less, about 12000 or less, about 8000 or less, or about 5000 or less. When the polymer dispersions includes both a liquid and a solid thermoset resin (e.g., both a solid epoxy resin and a liquid epoxy resin), the weight ratio of the solid thermoset resin to the liquid thermoset resin preferably is sufficiently high so that the material is tack free at about 25° C. The weight ratio of the solid thermoset resin to the liquid thermoset resin may be about 0.2 or more, about 0.4 or more, about 0.6 or more, or about 0.8 or more. The weight ratio of the solid thermoset resin to the liquid thermoset resin preferably is sufficiently low so that two pieces of the dry composite material can more easily be attached by heating the surface at least one of the pieces. The weight ratio of the solid thermoset resin to the liquid thermoset resin may be about 20 or less, about 10 or less, about 5 or less, about 3 or less, or about 2 or less. Compositions that are substantially free of, or entirely free of liquid thermoset resin (e.g., free of liquid epoxy resin), may also be used in the compositions according to the teachings herein.

A thermoset resin may be characterized as a room temperature liquid (i.e., a liquid thermoset resin). For example, the thermoset resin may be a liquid material having a glass transition temperature of less than 25° C., of about 20° C. or less, of about 10° C. or less. The glass transition temperature of the liquid thermoset resin may be about −60° C. or more, about −50° C. or more, about −30° C. or more, or about −10° C. or more. If the glass transition temperature is too low, the thermoset resin may flow out of the mold, may be difficult to handle (e.g., due to tack), may require long cure times, or any combination thereof.

The thermoset resin may include one or any combination of the thermoset resins described in U.S. Pat. No. 5,539,025 (Issued on Jul. 23, 1996) column 8, line 66 to column 9, line 62) and/or one or more of the thermoset resins described in International Patent Application Publication WO 2009/074293 (published on Jun. 18, 2009) pages 3, line 31 to page 5, line 2. The thermoset resin may include one or more epoxies, one or more phenolics, one or more polyesters, one or more acrylates, one or more polymides, one or more polyimides, or any combination thereof. Preferably the thermoset resin includes, consists essentially of, or consists entirely of one or more epoxy resins.

The epoxy resin may be any resin that includes one or more epoxide functional groups. The epoxy resin may be a product of polymerization reaction involving an epoxide containing monomer. The epoxide containing monomer may include one or more, or two or more epoxide groups. Some or all of the epoxide groups of the epoxide containing monomer may be terminal epoxide groups. For example, the epoxide group may include one or more (e.g., two or more) terminal epoxide groups. The polymerization reaction may be a homopolymerization or may be a copolymerization reaction. For example, the epoxide containing monomer may be copolymerized with one or more second monomers, such as a second monomer that reacts with an epoxide group.

The epoxy resin may be include one or more flexibilizing agents or may be free of flexibilizing agents. If employed, the flexibilizing agent may be copolymerized with the epoxide containing monomer, or a separate phase. Preferably the concentration of flexibilizing agent is about 29 wt. % or less, more preferably about 19 wt. % or less, even more preferably about 9 wt. % or less based on the total weight of the polymer in the composite material. The epoxy may include an epoxy described in U.S. Pat. No. 5,539,025 (Issued on Jul. 23, 1996) column 6, line 9 to column 7, line 2) or an epoxy resin described in International Patent Application Publication WO 2009/074293 (published on Jun. 18, 2009) pages 5, lines 26-33. Without limitation, the epoxy resin may include one or any combination of the following: an aliphatic glycol based epoxy resin, a bisphenol A based epoxy resin (e.g., bisphenol A+epichloohydrin), a diglycidyl ether of bisphenol A (DGEBA), a novolac based epoxy resin, a bisphenol-F based epoxy resin, or a brominated epoxy resin. Preferred novolac based epoxy resins have epoxide functional groups and a phenol-formaldehyde backbone. Examples of novolac based epoxy resins include D.E.N.™ resins commercially available from The Dow Chemical Company. Preferred D.E.N resins are substantially free of, or entirely free of solvent, such as D.E.N. 431, D.E.N. 438, and D.E.N. 439. Preferred novolac resins have a glass transition temperature of about 20° C. or less, more preferably about 15° C. or less, and most preferably less about 10° C. or less.

Hardener/Curative Catalyst

The dispersion may include one or more cross-linking agents (i.e., hardener) suitable for reacting with the thermoset resin. The composition may also include one or more curative catalysts suitable for accelerating the rate of the cross-linking reaction. The cross-linking agent and/or the curative catalyst may be encapsulated. The cross-linking agent and/or the curative catalyst may be in a particle phase, such as a particle phase including a solid thermoset resin, a particle including a liquid thermoset resin, a particle including a thermoplastic resin, or any combination thereof. The cross-linking agent and/or the curative catalyst may be soluble in the liquid matrix phase of the dispersion. Preferably, one or both of the cross-linking agent and the curative catalyst are not in some or all of the particles that contain the solid thermoset resin. It will be appreciated that the cross-linking agent and/or the curative catalyst may be provided to the fibers separately from the dispersion. For example, the process may include a separate step of coating or otherwise contacting the fibers with the cross-linking agent, with the curative catalyst, or both, prior to contacting the fibers with the dispersion.

The cross-linking agent may react with one or more of functional sites of the thermoset resin. The thermoset resin, the cross-linking agent, or both may be a compound having a sufficiently high functionality so that a network structure is formed. The Functionality of a compound (e.g., a thermoset resin or a cross-linking agent) describes the number of reactive sites on the compound that may be employed in a crosslinking reaction, such as a chemical cross-linking reaction used for curing the thermoset resin. For example, a resin having 2 terminal reactive epoxide groups has a functionality of 2. As another example, a diamine including two terminal —NH$_2$ groups has a functionality of 4. The cross-linking reaction may employ a step of reacting a functional group of the thermoset resin with a functional group of the cross-linking agent.

The cross-linking agent and/or curative catalyst are preferably selected and present in a sufficient quantity so that the thermoset resin rapidly cross-links when heated in the molding process according to the teachings herein.

The cross-linking reaction may be evaluated at one or more of the following curing temperatures, Tc: about 100° C., about 110° C., about 120° C., about 130° C., about 140° C., or about 150° C. and at one or more of the following target curing times: about 10 minutes, about 5 minutes, about 3 minutes, about 2 minutes, about 1 minute, or about 30 seconds. The cross-linking agent and/or curative catalyst are preferably selected and present in a sufficient quantity so that after reacting for the target cure time, the thermoset resin achieves a glass transition temperature equal to or greater than Tc−10° C., more preferably equal to or greater than −5° C. or more, even more preferably equal to or greater than Tc, even more preferably equal to or greater than Tc+5° C., even more preferably equal to or greater than Tc+10° C., and most preferably equal to or greater than Tc+15° C. The glass transition temperature on the cured material is measured using dynamic mechanical thermal analysis (DMTA). Dynamic mechanical thermal analysis (DMTA) is performed using a TA Instruments ARES G2 rheometer. Specimens are cut from the composite material. The specimen may be cut from the same panels which are used to obtain specimens for flexural modulus testing. The DMTA specimens have a rectangular geometry with dimensions of 1.75"×0.5" (length×width) and are cut to dimension using a wet circular mechanical saw. The specimen is loaded onto a torsion rectangular sample fixture at 30° C. During testing, small-amplitude oscillatory shear experimental conditions are employed, including a fixed oscillation frequency of 1 Hz and a strain amplitude of 2%. A temperature ramp from 30 to 220° C. at 3° C./min is employed. Nitrogen is imposed on the sample and the temperature is controlled with a forced-air temperature controller.

Without limitation the cross-linking agent may include one or more amines, one or more amides, one or more phenols, or any combination thereof. For example, the cross-linking agent may include, consist essentially of, or consist of one or any combination of the cross-linking agents selected from the group consisting of dicyandiamide, derivatives of dicyandiamide, aromatic amines, alicyclic amines, aliphatic amines, imidazole, imidazole derivatives, fatty amine curing agents, and phenols. The dicyandiamide derivative preferably is a compound obtained through a reaction using at least one of the amino, imino, and cyano groups. Examples of dicyandiamide derivatives include o-tolylbiguanide, diphenylbiguanide, or a product of a preliminary reaction of the amino, imino, or cyano group of dicyandiamide with the epoxy group of the epoxy compound used in the epoxy resin composition. Examples of the aromatic amine curing agent include m-phenylenediamine, diaminodiphenylmethane, m-xylenediamine, and various derivatives or isomers thereof. Examples of aromatic amine compounds include metaphenylene diamine, and diamino diphenyl sulfone, Other mines that may be employed include amino ethyle piperazine, amine-epoxy adduct, an accelerated aliphatic amine, a polytheylene polyamine, a metaphenylene diamine, a diamino diphenyl sulfone, a diethyletoluenediamine, an adduct including a primary amine and/or a secondary amine, an anhydride, or a polyamide. Examples of the alicyclic amine curing agent include isophoronediamine. The amine may be an aromatic amine. Example of Phenolic curing agent include Phenol novolak resin, a cresol novolak resin, a polyphenol compound and the like. The epoxy resin curing agent is preferably formulated in a dispersion or suspension in water.

The amount of the hardener in the composition is preferably about 0.4 or more, more preferably about 0.5 or more, more preferably about 0.6 or more, and most preferably about 0.7 or more equivalents with respect to the active hydrogen equivalents of all of the epoxy groups in the composition. The amount of the hardener in the composition is preferably about 3.0 or less, more preferably about 2.0 or less, even more preferably about 1.6 or less, even more preferably about 1.4 or less, and most preferably about 1.3 or less equivalents with respect to the active hydrogen equivalent of all of the epoxy groups in the composition. The amount of the hardener component in the composition is preferably about 1 part or more, more preferably about 2 parts or more, even more preferably about 3 parts or more, and most preferably about 4 parts or more, by weight, based on the total parts of epoxy resin in the composition. The amount of the hardener component is preferably about 25 parts or less, more preferably about 20 parts or less, even more preferably about 15 parts or less, and most preferably about 10 parts or less, by weight, based on the total weight of the one or more epoxy resins in the composition.

The composition may optionally include one or more cure accelerators suitable for increasing the rate of curing the thermoset resin, suitable for increasing the glass transition temperature of the cured thermoset resin, or both. For example the cure accelerators may be a compound that catalyzes the reaction of the epoxy resin with the curing agent. The amount of accelerator present may vary depending upon the particular curing agent used. Dicyandiamide may be used alone or may be used in combination with a curing catalyst of dicyandiamide or other epoxy resin curing agents. Examples of the curing catalyst of dicyandiamide combined therewith include ureas, imidazoles, imidazolidines, imidazolines, as well as quaternary ammonium, phosphonium, and other related "onium" salts or bases, amine oxides, Lewis acid catalysts and combinations thereof. Examples of commercially available products of the ureas include phenyl dimethyl urea, 2,4' toluene bis dimethylurea, 2,4' toluene bis dimethylurea, 4,4' methylene bis (phenyl dimethyl urea) 4,4' methylene bis (phenyl dimethyl urea) cycloaliphatic dimethyl urea manufactured by CVC Specialty Chemicals, Inc.) and cloro ureas such as 3,4 dichlorophenyl dimethyl urea, 4 chlorophenyl dimethyl urea. Examples of imidazoles include imidazole, 1-methylimidazole, 2-methylimidazole, 4-methylimidazole, 2-ethylimidazole, 2-ethyl-4-methylimidazole, 2-phenylimidazole, 1-benzyl-2-methylimidazole, 2-phenyl-4-methylimidazole, 1-cyanoethyl-2-ethyl-4-methylimidazole and the like. Among preferred tertiary amines that may be used as accelerators include, among others, methyl diethanolamine, triethylamine, tributylamine, benzyl-dimethylamine, tricyclohexyl amine, pyridine, quinoline, and the like. Examples of commercially available products of the imidazoles include 2MZ, 2PZ, and 2E4MZ (manufactured by Shikoku Chemicals Corp). Another category of accelerators that may be of use is Lewis acid catalysts including complexes of boron halides with bases. Such cure acclerators include boron trifluoride/piperidine complex, a boron trifluoride/monoethylamine complex, a boron trifluoride/triethanolamine complex, a boron trichloride/octylamine complex, or any combination thereof.

The dispersion particles may optionally include one or more polymer modifiers suitable for improving the mechanical properties of the thermoset resin. For example, the polymer modier may increase the impact properties and/or the tensile elongation (e.g., the elongation at failure) of the cured thermoset resin. Some modifiers may additionally function as a cross-linking agent.

The composition of the polymers in the present invention (e.g., the thermoset resin of the dispersion and/or the composite) may optionally be supplemented with one or more thermoplastic resins. The thermoplastic resin, if employed, preferably is provided in a thermoplastic resin dispersion. The thermoplastic resin may include one or more homopolymers, one or more copolymers, or both. Examples of thermoplastic resin that may be employed include polypropylenes, polybutylene terephthalates, acrylonitrile-butadiene-sytrene copolymers (ABS), polyamides, polyethylene terephtalates, polymethacrylates, polyvinyl acetal resins, polyvinyl acetates, polyacetal, polyphenylene sulfides, polyether sulfones, phenoxy resins, or any combination thereof. The thermoplastic resin may include one or more polymers suitable for toughening the thermoset resin so that the impact strength is increased. Particularly preferred tougheners include polymers having rubbers, copolymers, or both. For example, the toughener may include a butadiene-acrylonitrile copolymer, a carboxyl-modified butadiene-acrylonitrile copolymer, core shell polymers including rubber particles, an acrylate copolymer. Preferred acrylate copolymers include copolymers include one or more (e.g., two or more) monomers selected from the group consisting of acrylate, methacrylate, methyl methacrylate, and butyl acrylate. The toughener may include, consist essentially of, or entirely of PARALOID® EXL-2611 or PARAOLOID® XL-3387 (commercially available from Rohm & Haas) comprising a butyl acrylate-methyl methacrylate copolymer.

Preferred thermoplastic polymers have a solid to liquid phase transition of about 70° C. or more, about 100° C. or more, about 130° C. or more, or about 150° C. or more. The thermoplastic polymer preferably has a solid to liquid phase transition of about 280° C. or less, about 220° C. or less, or about 180° C. or less. The solid to liquid phase transition may be a glass transition temperature, or a final melting temperature, both of which can be measured using differential scanning calorimetry by melting the thermoplastic polymer, then cooling at a rate of 10° C./min to 0° C. and then determining the transition temperature upon reheating the thermoplastic polymer at a rate of 10° C./min.

The dispersion may include one or more surfactants suitable for making an emulsion of the one or more ingredients that are in a dispersion particle. For example, the dispersion may include a surfactant suitable for making an emulsion of the thermoset resin. Similarly, the dispersion may include a surfactant suitable for making an emulsion of a hardener. Any art known surfactant may be employed. The surfactant may be a cationic surfactant, an anionic surfactant or a nonionic surfactant. The surfactant may include one or any combination of the surfactants described in U.S. Pat. No. 5,539,025 (Issued on Jul. 23, 1996) column 6, line 9 to column 7, line 2) and/or one or more of the surfactants described in International Patent Application Publication WO 2009/074293 (published on Jun. 18, 2009) pages 5, lines 26-33.

The composite material includes one or more fibrous materials suitable for reinforcing the composite material. The fibers may be in any form. For example, the fibers may include: short fibers, long fibers, non-woven fibers, woven fibers, or any combination thereof. The fibers may be unidirectional fibers. The fibers may be oriented in a plurality of directions. For example one fiber may be oriented in a first direction and a second fiber may be oriented in a second direction having a predetermined angle from the first direction. The fibers may be randomly oriented in two or more dimensions. For example, the fibers may be randomly oriented short fibers. The fibers may include organic fibers, inorganic fibers or both. An organic fiber may be a polymeric fiber, such as an aramid fiber. Examples of inorganic fibers that may be employed include carbon fibers, glass fibers, silicon carbide fibers. A particularly preferred fiber is a carbon fiber. The fiber preferably is a reinforcing fiber suitable for increase the stiffness and/or strength of the composite material. Preferred fibers are generally stiff as characterized by a high tensile modulus. For example, the fibers may have a tensile modulus of about 20 GPa or more, about 50 GPa or more, about 100 GPa or more, about 150 GPa or more, or about 200 GPa or more. The fibers may have a tensile modulus of about 500 GPa or less, or about 300 GPa or less.

The concentration of the fibers should be sufficiently high so that the fibers can provide the desired reinforcing properties to the composite material. The concentration of fibers is preferably about 25 weight percent or more, more preferably about 35 weight percent or more, even more preferably about 45 weight percent or more, and most preferably about 52 weight percent or more, based on the total weight of the dry composite material. The concentration of fibers is preferably sufficiently low so that the dispersion particles can flow between the fibers and/or so that a high bulk density (e.g., compared to the fibers without the thermoset material) can be achieved. The concentration of the fibers preferably is about 85 weight percent or less, more preferably about 78 weight percent or less, even more preferably about 70 weight percent or less, even more preferably about 66 weight percent or less, and most preferably about 62 weight percent or less, based on the total weight of the dry composite material.

Optionally, the dry composite material, the dispersion, or both may include an internal mold release agent. The mold release agent may be selected so that any force required to remove the molded part from a mold die is reduced or eliminated. The mold release agent may allow for increasing the molding temperature by making it easier to remove the cured material from the mold. Examples of internal mold release agents that may be employed include waxes, silicones, fluoropolymers, surfactants, fatty acids, fatty acid esters, or any combination thereof.

The ratio of the volume of the thermoset resin to the volume of the fibers is preferably about 0.05 or more, more preferably about 0.10 or more, even more preferably about 0.20 or more, and most preferably about 0.3 or more. The volume ratio of the thermoset resin and the fibers is preferably about 5 or less, more preferably about 2.5 or less, even more preferably about 1.5 or less, and most preferably about 1 or less.

The ratio of the weight of the thermoset resin in the dispersion to the weight of the matrix liquid phase of the dispersion preferably is about 0.1 or more, more preferably about 0.3 or more, even more preferably about 0.6 or more, even more preferably about 1.0 or more, and most preferably about 1.2 or more. The ratio of the weight of the thermoset resin to the weight of the matrix liquid phase of the dispersion preferably is about 10 or less, more preferably about 8 or less, even more preferably about 6 or less, even more preferably about 5 or less, and most preferably about 4 or less.

The total weight of the fibers, thermoset resin, optional thermoplastic resin, the curative, the cure catalyst, and the internal mold release agent, preferably is about 50% or more, more preferably about 60% or more, even more preferably about 70% or more, even more preferably about 80% or more, even more preferably about 90% or more, even more preferably about 95% or more, and most preferably about 99% or more based on the total weight of the dry composite material.

While the present invention has broad applicability in many composites making processes, listed below are three exemplary categories of processes:

The process may include one or more steps of preparing a dispersion, such as an aqueous dispersion. According to the teachings herein, a dispersion may include, consist essentially of, or consist entirely of one or any combination of the following: a continuous liquid phase, one or more thermoset resins, one or more surfactants, one or more mold release agents, one or more catalysts, or one or more curatives. The process may include a dispersion (e.g., a dispersion mixture) that includes a step of mixing or otherwise combining a plurality of dispersions. Generally, at least one dispersions includes a thermoset resin. When a plurality of thermoset resins are employed (such as two thermoset resins having different initial glass transition temperatures) two or more thermoset resins may be included in a single dispersion particle. Alternatively, the dispersion may be a dispersion mixture including a first dispersion particle including thermoset resin and a second dispersion particle including thermoset resin, where the first and second dispersion particle have different concentrations of the two thermoset resins. For example, the dispersion particles may be characterized by one or any combination of the following features: the concentrations of the first thermoset resin in the first and second dispersion particle are different (e.g., by about 5 wt. % or more, or by about 10 wt. % or more); the concentrations of the second thermoset resin in the first and second dispersion particles are different (e.g., by about 5 wt. % or more, or by about 10 wt. % or more); the ratio of the concentrations of the first and second thermoset resins are different in the two dispersion particles (e.g., the ratio of the two concentration ratios is about 0.8 or less or 1.25 or more). For example, i) a first dispersion particle may include the first thermoset resin and be free of the second thermoset resin and/or ii) a second dispersion particle may include the second thermoset resin and be free of the first thermoset resin.

The use of dispersions provide the advantage of being able to easily tailor the composition of the matrix material (i.e., the material that remains in the matrix of the composite after the water is removed). A composition can be tailored using a mixture of different dispersions. For example, the composition may be formed from a mixture of two or more (e.g., three or more, or even all) of the following: a dispersion of curative particles in water, a dispersion of a solid thermoset resin in water, a dispersion of a non-solid thermoset resin in water (e.g., a liquid thermoset resin), a dispersion of a toughener in water, a dispersion of a mold releasing agent in water, or a dispersion of a cross-linking accelerator in water. Particles of any of these materials can be employed without concern that the viscosity of the dispersion mixture will be affected by the flow characteristics of the individual ingredients.

The process may include one or more steps of preparing a dispersion, such as an aqueous dispersion The dispersion may be made by any convenient method suitable for providing a dispersion of particles in a liquid having one or more of the features according to the teachings herein. Preferred processes result in dispersion particles that are sufficiently small so that they can flow enter and/or flow through the spaces formed between fiber particles, such as the spacing between fibers in a mat or in a bundle of fiber strands. The process for preparing a dispersion may include an emulsifying process. For example, a liquid component of the composition to be cured (i.e., of the dry composite material) may be prepared as an emulsion in water using a process that employs mixing and/or surfactant(s) for achieving a generally stable emulsion. An emulsifying process may also be employed with solid components of the composition. For example, the process may include a step of heating a solid component so that it becomes a liquid suitable for an emulsifying process. Upon cooling, such an emulsion particle may solidify so that a solid dispersion particle is formed. The process of preparing a dispersion may include mixing two or more components of the composition prior to making the dispersion. The process may include a step of emulsifying two components of the composition in different emulsifying step. The dispersion process may include one or any combination of the features described in PCT Patent Application Publication Numbers WO99/64216 (published on Dec. 16, 1999, see e.g. page 4, line 5 to page 15, line 28), WO02/46276A2 (published on Jun. 13, 2002), and WO 2011/064176A1 (published on Jun. 3, 2011, see e.g. page 3, line 1 to page 11, line 2); U.S. Pat. No. 3,879,324 issued on Apr. 22, 1975 (see e.g. column 1, line 63 to column 6, line 29), U.S. Pat. No. 3,993,843 issued on Nov. 23, 1976, U.S. Pat. No. 4,315,044 issued on Feb. 9, 1982 (see e.g., column 1 lines 8 to column 6, line 30), U.S. Pat. No. 4,222,918 issued Sep. 16, 1980, U.S. Pat. No. 4,886,485 issued on Dec. 12, 1989 (see e.g., col. 2, line 15 to column 9, line 48) U.S. Pat. No. 5,539,025 issued on Jul. 23, 1996 (see e.g. column 1, line 58 to column 2, line 24, and column 5 line 37 to column 12, line 57), U.S. Pat. No. 6,147,131 issued on Nov. 14, 2000 (see e.g. column 7, lines 4-16), and U.S. Pat. No. 5,688,842 (see e.g. column 3 line 39 to column 8, line 16); European Patent Application No. EP 1 266 920 B1 (published on Dec. 18, 2002), all incorporated herein by reference in their entireties. The process may include a step of preparing a high internal phase emulsion (HIPE) such as described in U.S. Pat. Nos. 4,018,426, 4,522,953, 5,198,472 and 5,210,104, all incorporated herein by reference in their entireties. An emulsification process may employ a batch process for preparing the emulsion or a continuous process for preparing the emulsion. By way of example, the process may include a step of gradually adding water into a mixture including the component(s) to be emulsified (e.g., a thermoset resin in a liquid state) and a surfactant, preferably while the mixture is being agitated. Agitation can be accomplished by any suitable means, such as with an agitator including one or more impellers. As another example, the process may include a step of mixing a first continuous stream of water with a second continuous stream including the liquid component(s) to be emulsified and a surfactant, using sufficient shear so that emulsion particles are formed. It will be appreciated that particles may be made by process other than by an emulsion process. For example, a dispersion particle may be made by an encapsulation process. An encapsulation process may be used to encapsulate one or more ingredients (e.g., in the same particle or in different particles). Such an encapsulation process may be particularly useful for encapsulating a curative (i.e., a hardener), a cure catalyst (i.e., a cross-linking catalyst), or both. For example, the dispersion may include particles containing epoxy resin and particles containing a hardener, wherein the epoxy resin particles are encapsulated, the hardener particles are encapsulated, or both. An encapsulated ingredient may be particularly useful for preventing reaction between an ingredient within the encapsulated particle and an ingredient exterior to the encapsulated particle, until a predetermined triggering condition is reached. The triggering condition may be heat, pressure, exposure to IR radiation, exposure to UV light, exposure to microvaves, or any combination thereof. For example, the triggering condition may be a sufficient amount of heat so that a critical temperature is reached (e.g., a temperature at which the encapsulating material melts or softens).

A dispersion particle may include a cross-linking agent, a cross-linking catalyst, or both. For some curing systems, it may be preferable for a dispersion particle, such as a dispersion particle including thermoset resin, to be substantially free of a cross-linking agent, to be substantially free of a cross-linking catalyst, or to be substantially free of both cross-linking agent and cross-linking catalyst.

The process may include a step of combining two or more dispersions. For example, the process may include a step of combining two or more different solid dispersion, the process may include a step of combining one or more solid dispersion and one or more emulsions, or both. By employing a plurality of different dispersion, it may be possible to use a group of dispersions for preparing different compositions having different components and/or having different concentrations of one or more component. Preferably all of the ingredients to be mixed with or otherwise dispersed into the fibers are included in a dispersion mixture that includes generally identical dispersion particles or a plurality of different dispersion particles. A dispersion, a dispersion mixture, or both may have a predetermined concentration of one or any combination of the following ingredients: water, resins (e.g., thermoset resins and/or thermoplastic resins), curative, catalyst, mold release agent, or surfactant).

One or more of the ingredients may be water soluble. For example, the catalyst, the curative, or both may be water soluble. As another example, the mold release agent may be water soluble. It will be appreciated that some or all of the water soluble component may be substantially or entirely excluded from some or all of the particles of the dispersion mixture.

The process may include a step of adjusting the amount of water in the dispersion mixture. For example, water may be added to a solid dispersion, to an emulsion, to a dispersion mixture, or any combination thereof. Similarly, water may be removed from one or more dispersions or from a mixture of dispersions (e.g., prior to contacting with the fibers). It will be appreciated that the flow characteristics of a dispersion or a dispersion mixture may be controlled by adjusting the water concentration.

Preferably, the temperature, mixing conditions and surfactant(s) employed in the process for preparing the dispersion are selected so that the dispersion particles have a diameter less than the predetermined maximum dispersion particle diameter limit. The ratio of the predetermined maximum dispersion particle diameter limit to the diameter of the fibers may be about 1.00 or less, preferably about 0.70 or less, more preferably about 0.50 or less, even more preferably about 0.30 or less, even more preferably about 0.24 or less, even more preferably about 0.10 or less and most preferably about 0.04 or less. By way of example, the dispersion, the dispersion may be employed with fibers having a diameter of about 40 µm and the dispersion particles size may be about 40 µm or less, about 28 µm or less, about 20 µm or less, about 12 µm or less, about 9.6 µm or less, about 4 µm or less, or about 0.96 µm or less. For use with a wide range of fiber diameters, it is preferred that the dispersion particles have a low diameter. Preferred the average diameter of the dispersion particles, the maximum diameter of the dispersion particles, or both is about 5 µm or less, more preferably about 2 µm or less, even more preferably about 1 µm or less, even more preferably about 0.8 µm or less, and most preferably about 0.6 µm or less. Typically, the dispersion particles have a diameter of about 0.1 µm or more; however particles having a diameter less than 0.1 µm can generally be employed.

Preferred dispersions have a sufficiently low viscosity so that they can flow into an architecture of fibers. For example, the dispersion preferably has a viscosity (at 25° C.) of about 50,000 cps or less, more preferably 10,000 cps or less, and most preferably about 3,000 cps or less.

The process includes one or more steps of combining the dispersion mixture and the fibers, so that a wet composite material including the dispersion mixture and fibers is formed. For example, the process may include one or any combination of the following steps: i) contacting the dispersion mixture (including dispersion particles and water) with one or more strands of fiber, ii) contacting the dispersion mixture with a plurality of fiber particles; or iii) contacting the dispersion mixture with a mat of fibers (e.g., woven fibers, non-woven fibers, or both). A process including the step of contacting the dispersion mixture with one or more strands of fibers may include one or more art known steps employed in direct long fiber thermoplastic processes in which strands of fibers are coated with a polymer. A process including a step of contacting a dispersion mixture with a plurality of fiber particles may include one or more art known steps employed in preparing sheet molding compounds including fiber particles. A process including a step of contacting the dispersion mixture with a mat of fibers may include one or more art known steps employed in making a thermoset/fiber prepreg. Some or all of the dispersion particles includes a thermoset resin. Preferably the dispersion mixture includes a cross-linking agent and a catalyst for accelerating the cross-linking reaction. The cross-linking agent and the catalyst may be soluble in the water, may be present in some or all of the dispersion particles, or both.

The process of contacting the fibers and the dispersion may be used in a process for making a sheet molding compound that includes reinforcing fibers. Advantageously, a sheet molding compound prepared according to the teachings may be prepared in a process that is free of a maturation step to control the viscosity, that is free of a step of adding additional fillers (e.g., non-fibrous fillers, such as non-fibrous mineral fillers) to control the viscosity, or both. For example, the process may be free of a maturation step that increases the cross-link density or the glass transition temperature of the resin. Prior to the present invention, in typical sheet (composite) molding compound resins, mineral fillers such as calcium carbonate are added to increase viscosity. Prior to the present invention, after the composite is formed by molding, the composite requires a maturation step which involves applying heat to advance the composite and begin to increase the cross link density. This increase in cross link density significantly increases the material system viscosity, which in turn enables the pre-molding composite to have enough structure to be handled and placed into a mold for another (e.g., a final) compression molding step. In the present invention, the dispersion has a relatively low viscosity, typically around 1000 cps) compared with the viscosity of the thermoset resin and/or other ingredients in the dispersion. For example, the ratio of the viscosity (e.g., the zero shear viscosity) of the thermoset resin to the viscosity of the dispersion may be about 2 or more, about 10 or more, about 100 or more, or about 1000 or more. The thermoset resin may even be a solid (i.e., having essentially an infinite viscosity at room temperature). As such, the aqueous phase of the dispersion allows for the ease of infusing and mixing a fibrous material used for reinforcement with a thermoset resin having a generally high viscosity, such as a solid thermoset resin. In contrast, the prior art generally requires that the thermoset resin be in a solid state when mixed with the fibers. As discussed herein, the fibrous material for the sheet molding compound may be in any form, such as short fiber, woven fibers, or unidirectional fibers. After contacting the dispersion and the fibers, the wet composite material may be processed into a sheet or other shape suitable for a sheet molding operation, for example by casting, filming, extruding, or pouring onto a flat substrate (e.g., a flat release substrate). Before using the composite material (e.g., in a sheet form) in a sheet molding operation, it may be desirable to increase the viscosity of the wet composite material. In order to increase the viscosity of the pre-molding composite, the some or all of the aqueous portion of the wet composite material may be removed using a drying step to form a dry composite sheet. For example, the dry composited sheet may consist substantially of solids including the fibers and solid resin (e.g., the solid thermoset resin). Preferably the concentration of solids in the dry composite sheet is about 50 volume percent or more, more preferably about 70 volume percent or more, even more preferably about 80 volume percent or more, and most preferably about 90 volume percent or more, based on the total volume of the sheet. It will be appreciated that the sheet may include some liquid material, such as a liquid resin. For example, the sheet may include a liquid phase thermoset resin, such as a liquid epoxy resin. Small amounts of such resins may be sufficient for serving as a binder for binding together two solid resin particles, for binding together a solid particle and a fiber, or both. The apparent viscosity of the dry composite material (i.e., the dehydrated material system) may be very high, and may be incapable of flowing at room temperature. However, the dry composite material preferably is still formable after heating. For example, the dry composite material may be formable after heating to a temperature greater than the glass transition temperature of the thermoset resin. The dry composite sheet may be used in a traditional SMC (sheet molding compound) compression molding process. Such a process preferably employs a sufficient amount of heat to soften the thermoset resin for shaping into a part and to rapidly cure the shaped part. For example, the temperature may be sufficiently high so that the part is cured in about 10 minutes or less, about 5 minutes or less, about 3 minutes or less, about 2 minutes or less, or about 1 minute or less. SMC compression molding process preferably employs a sufficient amount of pressure for achieving a desired shape. As such, this process eliminates the maturation step typically required in traditional SMC materials today. In the present invention, heat and water content are the preferred control mechanisms used to control the viscosity of the dispersion, and the composite made using the dispersion may thus include polymer having a relatively high viscosity, as opposed to prior SMC systems that require starting with relatively low viscosity thermoset polymers and adding fillers or advancing the cross linking reaction as is done in traditional thermosetting material systems. Because extra fillers are not needed, the additional benefits of improved strength and ductility in the present system are obtained.

The process of contacting the fibers and the dispersion may be used in a direct long fiber thermoset process similar to traditional direct long fiber thermoplastic processes. Such a process employs long fibers that contacts the dispersion as the fibers in an extruder or other apparatus suitable for pumping the dispersion. In a traditional direct long fiber thermoplastic system (DLFTP), the thermoplastic polymers are generally heated so that they melt and blend prior to contacting with the fibers. For example, the traditional DLFTP system may employ an extruder into which the thermoplastic polymers are introduced through a first opening (e.g., an upstream opening) of the extruder. After melting the thermoplastic polymer, the molten polymer contacts the fibers that are introduced through a second opening of the extruder in a downstream or final section of the extruder. Such a process may be employed in producing an extruded log having very long, discontinuous fibers. In the traditional DLFTP system employing thermoplastics, the extruded log is generally immediately shuffled to a compression molding press while the thermoplastic is in a molten state (e.g., before any significant heat is lost), and molded between a pair of matched mold dies. The dispersions according to the teachings herein enable the use of a DLFTP system with a thermoset resin, and is thus referred to as a DLFTR system. In the DLFTR process, the end product may have long fibers. For example the fiber length may be about 10 mm or more, about 30 mm or more, about 60 mm or more, or about 100 mm or more. Prior to the present invention, thermoset resins have not been configured to run in the DLFTP process. The present invention provides a way to run thermoset materials in standard DLFTP extruders and compression molds. In a DLFTR process, a dispersion including solid particles having a thermoset resin is fed into an extruder (e.g., a standard DFLTP extruder). For example, the dispersion may be fed into the first section of the extruder, in the same location as the thermoplastic materials typically are fed. The dispersion may advance along the screw of the extruder and contact the fibers in the a downsteam section (e.g. a last section) of the extruder screw to form an intermediate wet composite material. While in the extruder screw, the intermediate wet composite material may be placed under a vacuum and/or a sufficient amount of heat may be applied so that some or all of the water is removed. For example, a sufficient amount of water may be removed so that the composite material is a dry composite material prior to exiting the extruder. It will be appreciated that some or all of the drying may occur in a component of the extruder downstream of the extrusion screw. The material leaving the extruder preferably is sufficiently dry so that it can be handled as a solid either immediately or after cooling to a temperature at which the solid thermoset resin is a solid. Thus prepared, the dry composite material may be in a shape (e.g., a log or other shape) suitable for placing in a compression mold. It will be appreciated that the process may include a step of cutting the dry composite material to a predetermined length, volume, or mass to form a charge for a molding process. The dry composite material (e.g., the charge) may be placed immediately in a compression mold (e.g., prior to the temperature of the material dropping to room temperature). Here, any residual heat, such as from a drying step, may reduce the heating and/or time required for curing the thermoset resin in the mold. Alternatively, the process may include a step of cooling the dry composite material and storing it for later use in a compression molding process. For example, the dry composite material may be cooled to about room temperature prior to a compression molding step. The teachings herein enables this approach due to the ability to easily add the dispersion (e.g., an epoxy based dispersion) into existing DLFTP extruders for blending it with the fiber reinforcement of choice, and removing some or all of the excess water, and subsequently compression molding a net shape composite.

FIG. 1 is an illustrative polymer emulsion 10. The emulsion includes a continuous matrix liquid phase 18 and an emulsified phase 14. The emulsified phase includes a plurality of emulsion particles 12. The emulsion preferably includes a surfactant 16 that reduces the surface tension between the two phases, that creates a more stable emulsion, or both. Preferably the emulsion includes a thermoset resin. The emulsion particles are generally prepared at a temperature at which the thermoset resin is a liquid. It will be appreciated that an emulsion may be cooled to a temperature at which the thermoset resin becomes a solid so that a dispersion of solid particles in the matrix liquid phase 18 is formed.

Figure 2:
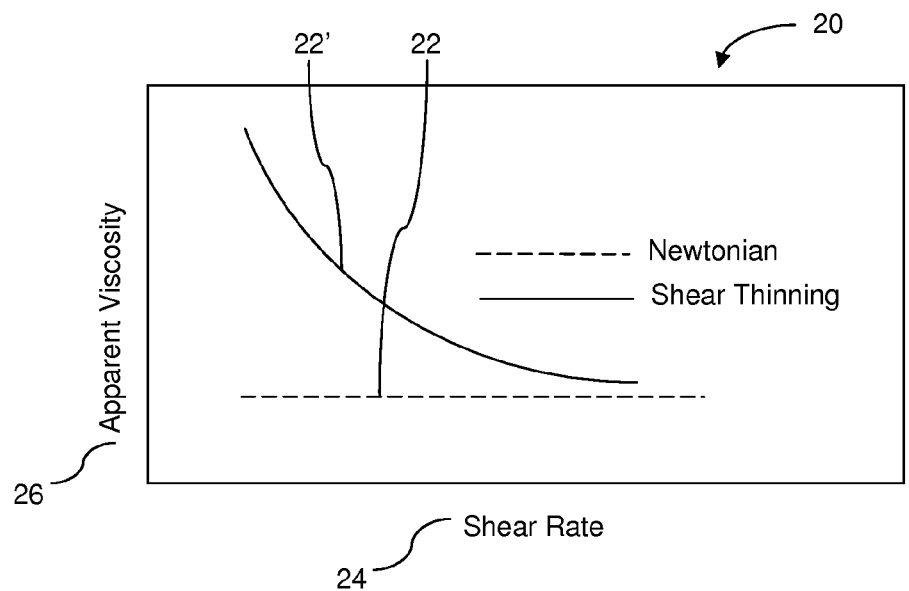
FIG. 2 is an illustrative graph showing an expected relationship between the apparent viscosity and the shear rate for a Newtonian fluid and for a material that exhibits shear thinning.

FIG. 2 is an illustrative graph 20 showing some of the features and differences in the behavior of a flowable material that is characterized as being shear thinning 22', and a flowable material that has Newtonian flow characteristics 22. Here, a flowable material may be a molten polymer, a solution (e.g., a polymer solution), an emulsion, or a dispersion of particles. The graphs 20 illustrate the relationship between the apparent viscosity 26 and the shear rate. With reference to FIG. 2, a shear thinning flowable material may have a relatively high apparent viscosity when the viscosity is measured at low shear rates compared with the apparent viscosity measured at higher shear rates. In a shear thinning material, as the shear rate increases, the absolute value of the first derivative of the apparent viscosity with respect to shear rate decreases and/or the apparent viscosity plateaus to a generally constant value. In curve for the Newtonian material 22, the apparent viscosity is relatively constant (e.g., compared with a shear thinning material). It will be appreciated that when impregnating fibers with high concentrations of polymer, it may be advantageous to use a material having a generally Newtonian viscosity-shear rate relationship so that the material easily flows between fibers under these low shear rate regimes.

Figure 3A:
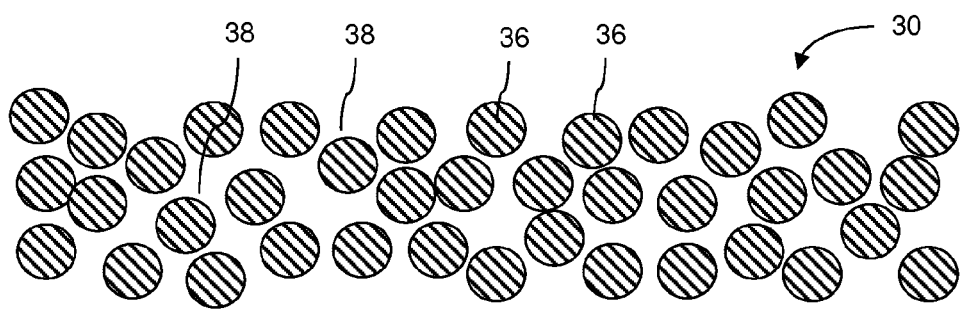
FIG. 3A is a cross-sectional view of an illustrative fiber architecture.
Figure 3B:
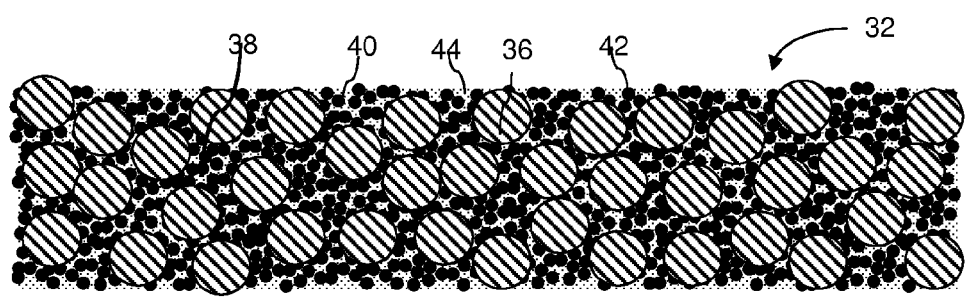
FIG. 3B is a cross-sectional view of an illustrative wet composite material including fibers and a dispersion of particles.
Figure 3C:
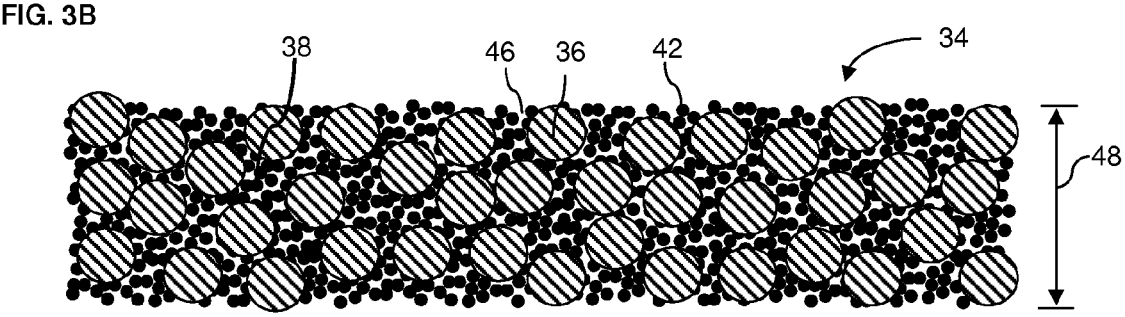
FIG. 3C is a cross-sectional view of an illustrative dry composite material including solid particles distributed throughout a fiber architecture.

FIGS. 3A, 3B, and 3C are drawings of illustrative cross-sections at various intermediate stages of preparing a pre-molding composite article. FIG. 3A illustrates an architecture of fibers 30. With reference to FIG. 3A, the cross-section is taken at a location where all of the fibers 36 are perpendicular to the plane of the cross-section, so that only the short dimension (e.g., diameter) of the fibers are shown. It will be appreciated according to the teachings herein, that fibers may be in any arrangement. For example, they may be aligned uniaxially, aligned biaxally, randomly aligned, aligned randomly in a plane, and the like. The fibers may be provided as a mat, such as a woven fabric or a non-woven fabric. The architecture of fibers 30 includes spaces 38 between the fibers. FIG. 3B is an illustrative cross-section 32 of the fiber architecture 30 after impregnating with a particle dispersion 40. Here, the material may be characterized as a wet composite material. The particle dispersion includes solid particles 42, dispersed in a carrier liquid 44. The solid particles 42 preferably includes, consists essentially of, or consists entirely of one or more thermoset resins. As illustrated in FIG. 3B, the particle dispersion 40 may fill some of, substantially all of, or entirely all of the spaces 38 between the fibers 36. FIG. 3C is an illustrative cross-section 34 after a step of drying the composite material to remove some of, or even all of the liquid from the impregnated particle dispersion. As such, the space between the fibers 38 may include void space 46. The dry composite material of FIG. 3C may be characterized by a thickness 48. It will be appreciated that in addition to the thermoset resin, the composite materials of FIGS. 3B and 3C may include additional materials, such as described herein. For example, the materials may include a cross-linking agent, a cross-linking accelerator, a flow modifier, a cure suppressant, a filler, a colorant, a surfactant, an internal release aid, a thermoplastic resin, or any combination thereof.

Figure 4:
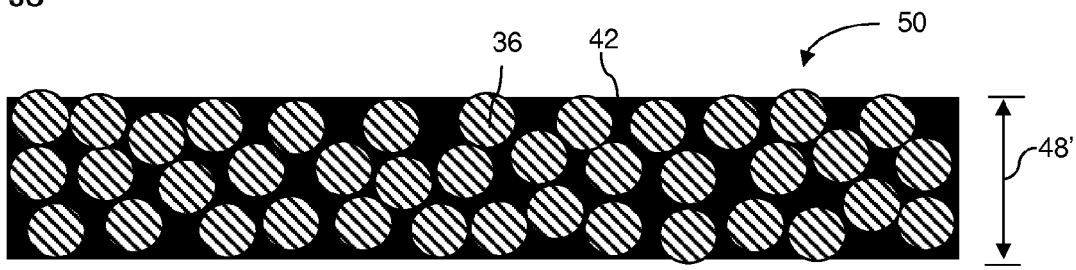
FIG. 4 is a cross-section of an illustrative formed or consolidated composite material after applying heat and/or pressure to a dry composite material.

FIG. 4 is an illustrative cross-section of a consolidated composite material 50 after a step of heating the thermoset resin and/or applying a force to the thermoset resin so that the material is consolidated. As illustrated in FIG. 4, the thermoset resin 42 may form a continuous phase. During the compaction step, the voids in the dry composite material (see e.g., FIG. 3C) are generally reduced or even eliminated. The thickness 48' of the consolidated composite material is generally less than the thickness 48 of the dry composite material.

Figure 5A:
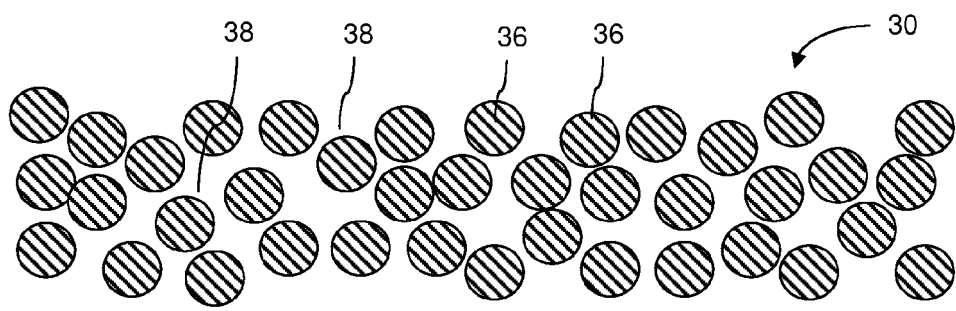
FIG. 5A is a cross-sectional view of an illustrative fiber architecture.
Figure 5B:
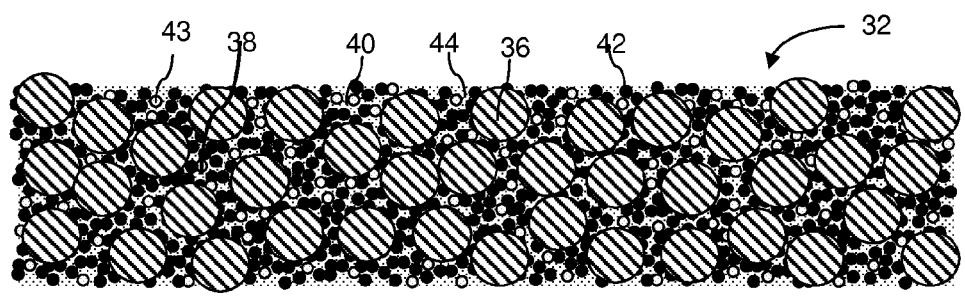
FIG. 5B is a cross-sectional view of an illustrative wet composite material including fibers and a mixture of dispersions including a first particle and a second particle.
Figure 5C:
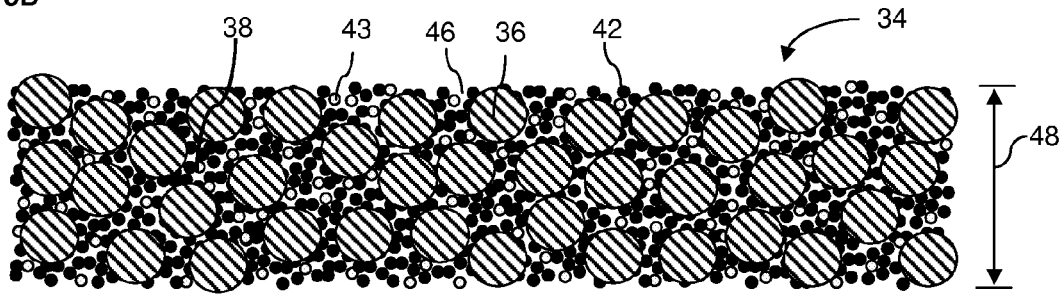
FIG. 5C is a cross-sectional view of an illustrative dry composite material including the solid particles of FIG. 5B distributed throughout the fiber architecture.

FIGS. 5A, 5B, and 5C are drawings of illustrative cross-sections at various intermediate stages of preparing a pre-molding composite article. These are similar to FIGS. 3A, 3B, and 3C, except the fiber architecture is impregnated with a mixture of dispersions. In FIGS. 5B and 5C, the composite material includes first solid particles 42, and second solid particles 43 that are different from the first solid particles 42.

The second solid particles 43 may include thermoset resin having a different physical characteristic (e.g., molecular weight, viscosity, glass transition temperature) compared with the first solid particles 52, the second solid particles 43 may include thermoset resin having a different chemistry than the first solid particles 42, or the second solid particles 43 may have a different function 43 (e.g., they may include a compound that is not a thermoset resin). For example, the second solid particles may include a cross-linking agent, a cross-linking accelerator, a mold release agent, or a toughener.

Figure 6:
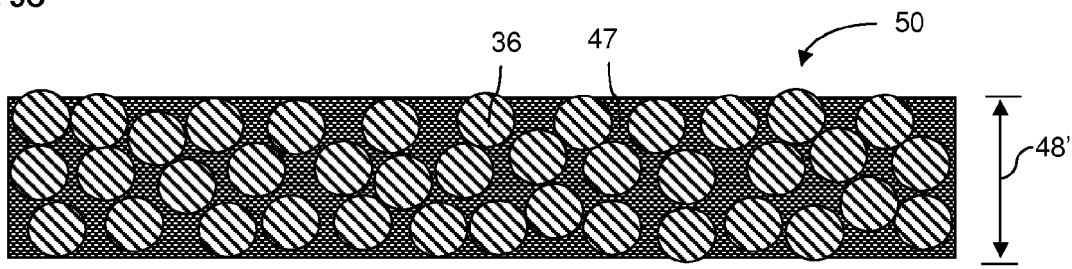
FIG. 6 is a cross-section of an illustrative formed or consolidated composite material after applying heat and/or pressure to a dry composite material formed from a mixture of dispersions.

FIG. 6 is an illustrative cross-section of a consolidated composite material 50 after a step of heating the thermoset resin and/or applying a force to the thermoset resin so that the material is consolidated prepared from a mixture of dispersions. As illustrated in FIG. 6, the first thermoset resin particles 42 may form a continuous phase. Optionally, the second solid particles may form a discrete phase.

The process of contacting the fibers and the dispersion may be used in an improved process for preparing a prepreg in which a fiber architecture is impregnated with the dispersion. In a typical prepreg process, the fiber architecture may include bundles of fibers, woven fibers, nonwoven fibers, stitched fibers, or braided fibers. The fibers may be in the form of mats. In one traditional method of impregnating fibers with a thermoset resin, the resin is first cast onto a release sheet at a known areal density by melting the resin and filming the molten resin onto the sheet with a knife blade type applicator. The film on the release sheet is then contacted with the fibers. For example, a resin coated release sheet may be brought into contact with the fiber system, and through several stages of heat and pressure, some or all of the resin is transferred from the release sheet to the fiber architecture in a process referred to as a "film transfer process". An alternative process is an "in line impregnation process" where the formulated resin components are impregnated into or applied over the fibers by the use of nip rollers and/or compaction rollers. Since the hardener is typically already added to the thermoset resin before the film transfer process or the in line impregnation process, the process must very carefully control the temperature of the resin and also the time at that temperature, so that the thermoset resin system does not prematurely cure. In such a traditional approach, the viscosity of the thermoset resin system is generally controlled by heat, cross linking, and fillers. In contrast, a dispersion according to the teachings herein may advantageously decouples the viscosity of the system that impregnates the fibers from the viscosity of the ingredients of that system (e.g., from the viscosity of the thermoset resins and/or the viscosity of other ingredients in the dispersion particles). For example, when the fibers are impregnated with the dispersion, the viscosity of the dispersion is primarily controlled by the viscosity of the fluid (e.g., the viscosity of the water) and the impact of the particles (including the size and concentration of the particles) on the fluid, but is generally not affected by the viscosity of the thermoset resin in the particles. Later, after water is removed, the viscosity of the material and other characteristics of the resin matrix will depend primarily on the viscosity and concentrations of the thermoset resin and other ingredients. Once the dispersion particles (e.g., including the thermoset resin, the curative, and the cure catalyst) are dispersed into the fibers to form a wet composite material, the wet composite material may be dried to remove some or all of the water. The dry composite material may be a prepreg suitagble for molding and curing into a final composite part.

The process may include a step of blending two or more dispersions. The process may include a step of blending a dispersion and an emulsion. The process may include a step of mixing a water soluble additive with a dispersion.

The process generally requires one or more steps of drying the wet composite material for remove some or all of the water. For example the wet composite material may include about 10 wt. % or more water (based on the total weight of the wet composite material) and there may be a need to dry the material so that a dry composite material is produced having about 2 wt. % or less water (based on the total weight of the dry composite material). Any method of removing water may be employed. For example, the wet composite material may be dried by heating the material, by flowing a dry purge gas over the material, by placing the material in a desicattor or other low humidity environment, by using a vacuum, or any combination thereof. The drying step preferably is selected so that: substantially none of the thermoset material is removed, so that substantially none of the cross-linking agent is removed, so that substantially none of the catalyst is removed, or any combination thereof. A drying step may be performed at a temperature of about 120° C. or less, preferably about 110° C. or less, more preferably about 100° C. or less, and most preferably about 90° C. or less. When a high drying temperature is employed (e.g., from about 100° C. to about 120° C.) it may be necessary for the drying time to be short (e.g., about 1 hour or less, about 20 minutes or less, or about 10 minutes or less). The drying temperature and the drying temperature should be sufficiently low so that any curing of the thermoset resin during the drying step does not substantially affect the ability to form a part using the dry composite material during a molding step.

The one or more drying steps may remove some of the water, and preferably removes substantially all of the water in the composite material. For example, the drying step(s) may reduce the amount of water to about 2 wt. % or less, preferably about 1 wt. % or less, more preferably about 0.5 wt. % or less, even more preferably about 0.2 wt. % or less, and most preferably about 0.1 wt. % or less.

The dry composite material may be employed in a generally high speed molding operation that employs heat to cure the thermoset material and pressure to shape the dry composite material. Preferred molding operations employ a molding temperature of about 100° C. or more, more preferably about 120° C. or more, even more preferably about 130° C. or more, even more preferably about 140° C. or more, and most preferably about 145° C. or more. The molding temperature is preferably about 210° C. or less, more preferably about 200° C. or less, even more preferably about 190° C. or less, even more preferably about 180° C. or less, and most preferably about 170° C. or less.

The dry composite material preferably has a glass transition temperature sufficiently high so that the dry composite material generally maintains its shape during storage. For example, the dry composite material may have a glass transition temperature of about 5° C. or more, preferably about 10° C. or more, more preferably about 13° C. or more, even more preferably about 15° C. or more, and most preferably about 17° C. or more. The dry composite material preferably has a glass transition temperature sufficiently low so that the material can be softened and for shaped in short periods of time. For example the time for softening and shaping the dry composite material may be about 20 minutes or less, about 3 minutes or less, about 1 minute or less, about 30 seconds or less, or about 20 seconds or less. The softening and shaping time may be about 2 seconds or more, about 5 seconds or more, or about 10 seconds or more. The softening and shaping time may be the time from placing the dry composite material in the heated mold to the time the mold is closed. For example, the dry composite material may have an initial glass transition temperature of about 75° C. or less, preferably about 60° C. or less, more preferably about 50° C. or less, even more preferably about 40° C. or less, even more preferably about 30° C. or less, and most preferably 22° C. or less.

The process may include one or more steps of preparing a kit that includes a plurality of individual pieces of dry composite materials. The pieces may be separate, or may be attached. It will be appreciated that the individual pieces of a dry composite material may have the same shape, may have different shapes, may have the same composition, may have different compositions, or any combination thereof. The process may include one or more steps of cutting a dry composite material into a predetermined shape. An attached kit may include a step of adhering or otherwise attaching a dry composite material to another dry composite material. For example, a first dry composite material may be attached to a second dry composite material by heating at least a region of the surface of at least one of the first or second dry composite materials to a temperature greater than the glass transition temperature of the thermoset resin. The thermoset resin may be heated to a temperature sufficient for making at least a portion of the surface tacky. Any source of energy for heating the surface may be employed. The surfaces may be contacted before, during or after heating the surface. After heating and contacting heating the surfaces, the surfaces may be allowed to cool so that the thermoset resin returns to a solid state. The kit (e.g., the attached kit) may be employed as the pre-molding article according to the teachings herein.

The process may include one or more step of preheating and/or preforming the dry composite material (e.g., the prepreg) so that the dry composite material may easily be placed into a mold. For example, the process may include a step of forming a shaped blank suitable for placing into a mold. The preheating step preferably is at a sufficient time and temperature so that the dry composite material softens. For example, the preheating temperature preferably is greater than the glass transition temperature of the uncured dry composite material. During the preheating step, the material preferably is heated to a temperature of about 25° C., or more, more preferably about 35° C. or more, and most preferably about 40° C. or more. The preheating temperature and time should be sufficiently low so that the dry composite material does not substantially cure (e.g., so that the dry composite material is formable at the preheating temperature). For example, the preheating temperature may be about 100° C. or less, preferably about 90° C. or less, even more preferably about 80° C. or less, and most preferably about 70° C. or less. Any suitable heat source may be employed for preheating the material. For example, the heat source may include radiant heat, convection heat, or both. The preforming step may include a step of placing the material (e.g., the preheated dry composite material) into a preforming tool. Preferably the preforming tool is maintained at a temperature equal to, or less than the glass transition temperature of the thermoset resin. For example, the temperature of the preforming tool may be sufficiently low so that some or all of the thermoset resin solidifies (i.e., undergoes a liquid to solid phase transition) in the preforming tool. The preforming step preferably includes a step of applying sufficient pressure to the dry composite material (e.g., while at a temperature above the glass transition temperature of the thermoset resin), so that the material is formed into a predetermined shape. For example, the material may be formed into a blank having a shape suitable for molding into a finished part. The preforming step preferably is performed using a combination of time and temperature that does not substantially advance the curing of the thermoset resin. For example, during the consolidation step, any increase in the glass transition temperature of the thermoset resin preferably is about 40° C. or less, more preferably about 20° C. or less, even more preferably about 10° C. or less, and most preferably about 5° C. or less.

The process may include a step of consolidating the dry composite material after the drying step and prior to cross-linking the thermoset resin in a cross-linking step. The consolidating process, if employed, may use heat and/or force to increase the bulk density of the dry composite material. After the consolidating step, the ratio of the bulk density of the dry composite material to its theoretical density preferably is about 90% or more, more preferably about 95% or more, even more preferably about 98% or more, and most preferably about 99% or more. It will be appreciated that a consolidation step may be part of a preforming step, or may be a separate step. For example, a consolidation step may be employed prior to a preforming step.

The composite material, prior to molding (e.g., after drying and/or consolidating), preferably has a long out time. The out time may be determined by the time that the material can be stored at a temperature of about 25° C. without changes in the properties of the material. For example, the material may maintain its glass transition temperature (within 5° C.) and/or its drapability during storage. Preferably, the material has an out time of about 10 days or more, more preferably about 20 days or more, even more preferably about 30 days or more, even more preferably about 45 days or more, and most preferably about 90 days or more. The out time may be sufficiently long so that the pre-molding article can be efficiently produced, inventoried, and shipped to a molding facility prior to use.

While the dry composite material is in the mold, it rapidly cures and the glass transition temperature of the thermoset material increases. The glass transition temperature of the thermoset material increases sufficiently so that the molded part can be removed without needing to cool the mold. For example, the molded part may be sufficiently cured so that it can be removed from the mold (e.g., without deforming the part) in a molding time of about 10 minutes or less, about 7 minutes or less, about 5 minutes or less, about 3 minutes or less, or about 2 minutes or less. The minimum molding time may be about 10 seconds or more, about 20 seconds or more or about 30 seconds or more. By eliminating the need to cool the mold for removing the part, faster molding cycle times can be achieved.

During the molding of the dry composite material, the glass transition temperature of the thermoset resin increases. By the end of the molding step, the glass transition temperature of the thermoset resin is sufficiently high so that the cured article is capable of being removed from the mold without deforming the article and without substantially cooling the mold. For example, the process may be free of a step of cooling the mold by 35° C. or more, preferably free of a step of cooling the mold by 15° C. or more, and more preferably free of a step of cooling the mold by 5° C. or more, prior to removing the article from the mold.

After curing in the mold, the cured thermoset resin in the composite article preferable has a glass transition temperature equal to, or greater than the molding temperature, and more preferably exceeds the molding temperature by about 5° C. or more. For example, the glass transition temperature of the thermoset resin after curing may be about 120° C. or more, about 125° C. or more, about 130° C. or more, about 135° C. or more, about 140° C. or more, about 145° C. or more, about 150° C. or more, about 155° C. or more, or about 160° C. or more.

When the dry composite material contacts the mold, the material is rapidly heated and the rate of curing soon reaches a maximum. During the one or two minutes starting when the dry composite material contacts the heated mold, the glass transition temperature of the thermoset resin preferably increases at an average rate of about 4° C./min or more, about 10° C./min or more, about 25° C./min or more, about 40° C./min or more, about 60° C./min or more, or about 80° C. or more.

The dispersions according to the teachings herein may be mechanical dispersion. For example, the dispersion may be a mechanical dispersion including a thermoset resin and optionally a cross-linking agent. In particular, the dispersion may include epoxy and an epoxy cross-linking agent (e.g., a hardener). The dispersion may be prepared using the process described in U.S. Patent Application Nos. 61/599,062 and 61/599,068, both filed on Feb. 15, 2012, and U.S. Pat. Nos. 5,539,021, 5,688,842, and 6,156,806, all incorporated herein in their entireties. The process may include a step of evenly spreading or otherwise uniformly applying the dispersion onto the surface of the fibers (e.g. onto the surface of a woven fiber mat) to form a prepreg. The process may include a step of placing the prepreg into a press or other device suitable for pushing the particles of resin in the dispersion into the woven fiber architecture. The process may include a step drying the impregnated material system in an oven to remove the water. The process may include a step of placing the prepreg in a heated press or other heated mold for a specified amount of time at a predetermined temperature for curing the prepreg. The press may be flat plates, which may be particularly useful for preparing test specimen for determining appropriate process conditions. Preferably, the mold is chosen for preparing a part having a predetermined shape. According to the teachings herein, it may be necessary to build up a kit using a plurality of plys of dry composite material. The process may employ one or more fixtures for facilitating the building up of a kit. The process may include a step of cutting pieces of the prepreg for one or more of the ply layers. A ply layer may be arranged in a specific orientation. This may be particularly useful when the ply layer has anisotropic properties. The process may include a step of debulking the kit. For example, a step of debulking a kit may include compressing it either between a matched mold die, or by encasing it in a vacuum bag and applying a vacuum, with the goal of removing any air or voids between individual layers or between the kit and the fixture. In a debulking or compressing step, it may be advantageous for the prepreg material to (1) have a certain amount of tack or stickiness, (2) to be able to drape or conform to three dimension surfaces, or both (1) and (2). Advantageously, the use of the dispersion in preparing the prepreg enables the viscosity of the thermoset polymers to be controlled by varying the ratio of solid to liquid epoxy material (e.g., without concerns regarding the ability to impregnate the fibers). More solid makes a strong final part due to higher molecular weights in the epoxy. However, more liquid epoxy resin creates tack and also holds the solid epoxy particles in place once the water is removed from the material in the drying step, before final cure. Surprisingly, high molecular weight epoxies which are solids at room temperature may be used (alone, or in combination with liquid epoxy resings) to construct a dispersion that enables the solid particles to remain and the prepreg to still have tackiness and drape before the final molding (curing) step.

Figure 7:
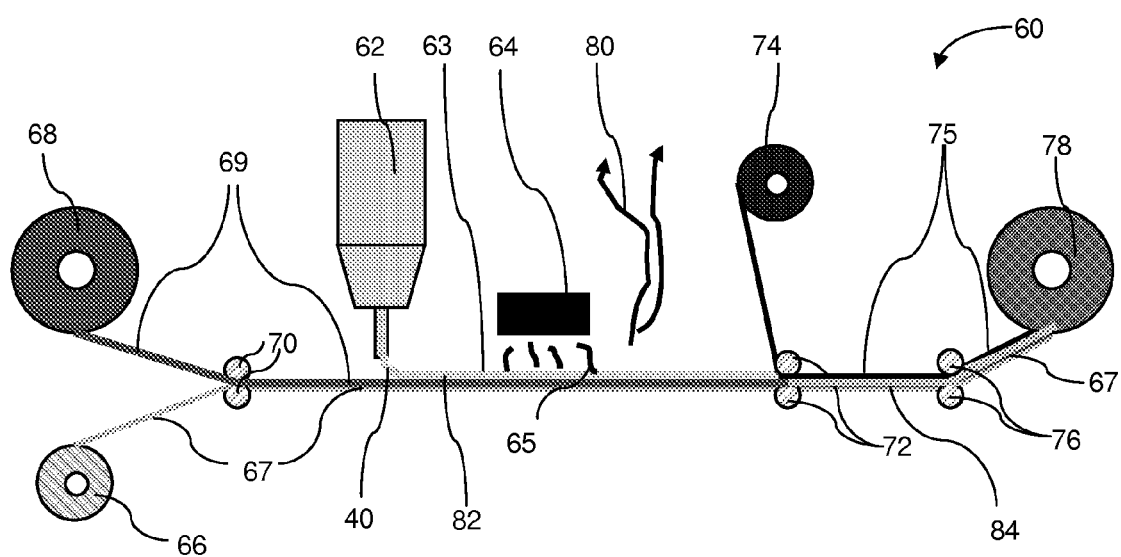
FIG. 7 is a schematic drawing illustrating processes and equipment that may be employed in making a wet composite material, a dry composite material, or a pre-molding article according to the teachings herein.

One or more of the aforementioned steps may be performed in a continuous process, such as illustrated in FIG. 7. FIG. 7 illustrates features of a system that may be employed in producing a pre-molding composite article. It will be appreciated that the system in FIG. 7 may include more, fewer, or different components. For example, the system may include a roll 68 of a fiber containing material 69 (e.g., a roll of woven or non-woven fibers). As such, the process for preparing the pre-molding composite article may include a step of unwinding a roll of fibers and feeding it between a pair of feed rollers 70. The system may include a roll 66 of a release film 67 for supporting the materials during processing and/or for separating layers of the composite material. The release film 67 may contact the fiber material 69 at the feed rollers 70. The system may include dispersion dispensing device 62 for dispensing the particle dispersion 40. The dispersion dispensing device 62 preferably dispenses the dispersion 40 at a uniform rate, at a uniform thickness, or both. The system may include a heater 64, a vacuum, or both for removing some or all of the carrier liquid 80 (e.g., moisture) from the dispersion. The system may include a set of rollers (not shown in FIG. 7) between the dispenser 62 and the heater 64 to accelerate the flow of the dispersion 40 into the spaces between the fibers. The system may include a set of compression rollers 72. The compression rollers 72 may be used for applying an upper release film 75 above the materials and/or for compressing the composite material to remove some or all of the voids. The system may include a roll 74 for supplying the upper release film 75. The system may include one or more sets of take-up rollers 76 for guiding the composite material onto a roll. 78. It will be appreciated that an early stage, the materials may be characterized as a fiber material with the dispersion generally on top of the fibers 82. At a later stage, the materials may be characterized as fibers impregnated with some or all of the constituents of the dispersion (e.g., with the carrier liquid or without the carrier liquid) 84.

The pre-molding articles according to the teachings herein may be employed for molded parts having a range of geometries. The short molding cycle times achievable by employing the particles dispersions makes the materials particularly attractive for high volume parts. For example, the pre-molding articles may be used for production of automotive parts, particularly where the prior methods of preparing thermoset-fiber composites have proven to be costly. It will be appreciated that the particle dispersions according to the teachings herein may also be employed in laminate applications, in injection molding applications by preparing pellets suitable for injection molding, and other industrial composite applications. A 3-dimensional molded component (e.g., having varying thickness) can be prepared by compression molding a pre-molding article, by using the dispersion for preparing a sheet molding compound, or by preparing injection moldable pellets.

Test Methods

The glass transition temperature of a polymer (e.g., a thermoset resin) or a polymer composition that is free of fibers may be measured using differential scanning calorimetry according to ASTM D7426-08. The glass transition temperature of the composite material (prior to or after curing may be measured using dynamic thermal mechanical analysis as described herein before. For example, the glass transition temperature may be measured using an ARES G2 rheometer at a frequency of about 1 Hz, a strain amplitude of 2%, and a heating rate of 3° C./min.

The melting temperature and/or crystallinity of a polymer (e.g., thermoplastic polymer) may be measured using differential scanning calorimetry (DSC), according to ASTM D 3418.03.

Tack Test

The composite material (for example the dry composite material) is considered to be sufficiently free of tack if it can be mechanically handled (e.g., picked up, moved, or positioned) using a mechanical device without the material sticking to the device. For example, the composite material may be able to contact a stainless steel surface without sticking to the surface.

EXAMPLES

Example A

Preparation of High MW Epoxy Resin Dispersion

A particle dispersion including a solid thermoset resin is prepared as follows. The thermoset resin is D.E.R.™ 6155 solid epoxy polymer, commercially available from The Dow Chemical Company. The resin has an epoxide equivalent weight of about 1250-1400 g/eq (as measured according to ASTM D-1652), and a melt viscosity of about 40,000-55,000 cSt at 150° C. (as measured according to ASTM D-445). The resin has is a reaction product of epichlorohydrin and bisphenol A, and has a softening point of about 105-125° C. (as measured according to ASTM D-3104). The glass transition temperature of the solid thermoset resin is about 42° C. The thermoset resin is fed into a twin screw extruder by means of a feeder suitable for feeding solid materials. The extruder melt zones are set at about 140° C. An initial stream of deionized water (IA) is fed into polymer melt. A surfactant solution (60% active) including E-SPERSE 100 (60% active), commercially available from Ethox Chemicals LLC is also fed into the extruder. E-SPERSE 100 is a water soluble anionic surfactant. The surfactant may be fed at the polymer melt, may be fed along with the IA or may be fed after the IA. A heated dilution stream of deionized water is introduced into the extruder at a downstream zone, following the formation of the thermoset particles in the dispersion zone to obtain a dispersion. The dispersion is filtered through using a filter having a pore size of about 190 micron pore size filters. The resulting dispersion is stable and has the following properties illustrated in TABLE 1.

TABLE 1

Properties of the Dispersion Example A

| Property | Value |
| --- | --- |
| Concentration of D.E.R. ™ 6155 (% of solids) | 95 weight percent |
| Concentration of E-SPERSE 100 (% of solids) | 5.0 weight percent |
| pH | 5.74 |
| Percent Solids (as measured using IR) | 62.4% |
| Viscosity (RV4, 50 rpm) | 1246 cPoise |
| Average Particle Size, Vmean | 0.409 μm |
| Top particle size, D <90 | 0.560 |

Particle size is measured on diluted samples (diluted in DI water) with a Beckman Coulter LS 13 320 light-scattering analyzer. An epoxy optical model is used for analysis. The pH of the dispersion is measured using a Denver Instruments pH meter. The solids analysis is measured using a CEM LabWave 9000 microwave solids analyzer at 70% power. Viscosity is measured on a Brookfield rotational viscometer at the stated conditions.

Dispersion Example B

Technicure D-5 is a dicyandiamide based epoxy curing agent commercially available from AC catalysts, Inc. A suspension (dispersion) of Technicure D-5 is prepared by adding 10 g of deionized water to 2 g of Technicure D-5 powder and subsequent mixing on a vertex mixer for about 1 minute.

Dispersion Example C

Dispersion Example C is a mixture of Dispersion Example A and Dispersion Example B. Example C is prepared by mixing about 20 g of the epoxy dispersion and about 4.3 g of the Technicure dispersion. The two dispersions are mixed using a dual axes mixer for about 2 minutes at 3000 rpm.

Dispersion Example D

Dispersion Example D is a dispersion prepared according to the method used to prepare Dispersion Example A, except 50 weight percent of the solid epoxy resin is replaced by an epoxy novalac resin. The epoxy novalac resin is D.E.N.™ 438 commercially available from Dow Chemical Company. It will be appreciated that any epoxy novalac resin having a glass transition temperature less than about 20° C. may be employed. Novalac resin that is not a room temperature solid and has a glass transition temperature of about 4° C. The resulting particle dispersion includes solid particles containing a mixture of the two thermoset resins.

Dispersion Example E

Dispersion Example E is a mixture of Dispersion Example D and Dispersion Example B. Dispersion Example E is prepared by mixing about 20 g of the thermoset resin dispersion and about 4.3 g of the Technicure dispersion. The two dispersions are mixed using a dual axes mixer for about 2 minutes at 3000 rpm.

Composite Example 1

Composite Example 1 is prepared using Dispersion Example C. Dispersion Example C is applied to a fiber mat by immersing the fiber mat into a bath containing the dispersion. After immersing the mat with the dispersion, the composite material is partially dried in air. After partially drying in air, the mat is again immersed in the dispersion bath so that additional dispersion can be applied. This process is repeated two more times so that the mat contains a sufficient amount of the dispersion. After achieving a desired concentration of dispersion particles, the wet composite material is dried in an oven. The material is initially dried at 80° C. The material does not cure during the drying conditions and can be molded and cured in a subsequent process. The material is tack free and can easily be handled. For example it can be lifted, moved and positioned by mechanical means.

Composite Example 2

Composite Example 2 is prepared using Dispersion Example E. Dispersion Example E is applied to a fiber mat by immersing the fiber mat into a bath containing the dispersion. After immersing the mat with the dispersion, the composite material is partially dried in air. After partially drying in air, the mat is again immersed in the dispersion bath so that additional dispersion can be applied. This process is repeated two more times so that the mat contains a sufficient amount of the dispersion. After achieving a desired concentration of dispersion particles, the wet composite material is dried in an oven at 80° C. for about 3 hours. The material is not expected to significant cure during the drying conditions and can be molded and cured in a subsequent process. The material is expected to be tack free and can easily be handled. The material is expected to be cure at about 150° C. in a cure time of about 10 minutes or less. After curing the glass transition temperature is expected to be about 150° C. or more, so that the part can be removed from a mold without cooling the part or the mold.

What is claimed is:

1. A pre-molding article comprising
   i) a polymer phase including
      a first thermoset resin having a glass transition temperature of about 30° C. or more,
      a second thermoset resin having a glass transition temperature of about 20° C. or less, and
      a curing agent; and
   ii) an inorganic phase, wherein the inorganic phase is present at a concentration of about 30 volume percent or more based on the total volume of the polymer phase and the inorganic phase;
   wherein the polymer phase is a continuous phase; and the weight ratio of the first thermoset resin to the second thermoset resin is about 1 or more.

2. The article of claim 1, wherein the curing agent is encapsulated.

3. The article of claim 1, wherein the inorganic phase includes fibers.

4. The article of claim 3, wherein the fibers are present at a concentration of about 60 volume percent or greater, based on the total volume of the polymer phase and the inorganic phase.

5. The article of claim 1, wherein the first thermoset resin is a solid epoxy resin.

6. The article of claim 5, wherein the second thermoset resin is a liquid epoxy resin.

7. The article of claim 6, wherein the ratio of the number average molecular weight of the solid epoxy resin to the number average molecular weight of the liquid epoxy resin is greater than 3.

8. The article of claim 7, wherein the solid thermoset resin has an epoxide equivalent weight of about 400 to about 14000.

9. The article of claim 8, wherein the glass transition temperature of the liquid epoxy resin is from about −60° C. to about 10° C.

10. The article of claim 9, wherein the glass transition temperature of the solid epoxy resin is from about 40° C. to about 120° C.

11. The article of claim 10, wherein the article includes a thermoset resin having a sufficiently high functionality and a sufficient concentration of curative so that the curing time is about 5 minutes or less at a cure temperature of about 150° C.

12. The article of claim 11, wherein the glass transition temperature of the polymer phase increases to about 130° C. or more, when the article is cured for about 5 minutes at a curing temperature of about 150° C.

13. The article of claim 10, wherein the inorganic phase includes fibers, and the weight ratio of the first thermoset resin to the second thermoset resin is less than 20.

14. The article of claim 1, wherein the second thermoset resin is a liquid epoxy resin.

15. The article of claim 1, wherein the thermoset resins are selected so that the article is non-tacky at a temperature of about 25° C.

16. The article of claim 1, wherein the thermoset resins are selected so that the article is non-tacky at storage temperature from about −30° C. to about 40° C.

17. The article of claim 1, wherein the polymer phase includes one or more thermoset resins selected from an epoxy, a phenolic, a polyester, an acrylates, a polymides, a polyimides, or any combination thereof.

18. The article of claim 17, wherein
   the article is sufficiently dried so that the concentration of water in the polymer phase is from greater than 0 weight percent to less than about 2 weight percent based on the total weight of the polymer phase; wherein the inorganic phase includes fibers and
   the concentration of fiber is 45 weight percent to 85 weight percent.

19. The article of claim 1, wherein the article is a sheet including carbon fibers impregnated with a water dispersion including thermoset resin particles having an average diameter of about 1 μm or less.

20. The article of claim 1, wherein the first thermoset resin is in a continuous phase in the polymer phase and the second thermoset resin is in a discrete phase in the polymer phase.

* * * * *